United States Patent [19]

Edwards

[11] Patent Number: 4,670,145
[45] Date of Patent: Jun. 2, 1987

[54] MULTIPLE BUNDLE FLUID SEPARATION APPARATUS

[75] Inventor: Donald W. Edwards, Wilmington, Del.

[73] Assignee: E. I. Du Pont de Nemours and Company, Wilmington, Del.

[21] Appl. No.: 883,319

[22] Filed: Jul. 8, 1986

[51] Int. Cl.$^4$ ............................................. B01D 13/00
[52] U.S. Cl. ............................... 210/321.1; 210/323.2; 210/433.2
[58] Field of Search ............... 210/321.1, 323.2, 433.2, 210/450

[56] References Cited

U.S. PATENT DOCUMENTS 4,080,296  3/1978  Clark ............................. 210/321.1 X
4,451,369  5/1984  Sekino ............................ 210/321.1

FOREIGN PATENT DOCUMENTS 0053635  6/1982  European Pat. Off. ......... 210/321.1

Primary Examiner—Frank Spear

[57] ABSTRACT

A fluid permeator apparatus is disclosed which comprises an outer cylindrical shell having disposed therein a generally concentric outer central tube in communication with a port at one end of the cylindrical shell and a port at the opposite end of the cylindrical shell which is in communication with an inner central tube located within the outer central tube. The outer central tube is perforated so as to render it in communication with the its outer surface. A plurality of permeator hollow fiber bundles having annular cross sections are removably mounted on the outer central tube. The hollow fibers are mounted with their open ends in at least one tubesheet which is in communication with the inner central tube. The cylindrical shell has an additional port for feeding fluid to be separated or removing residue.

11 Claims, 6 Drawing Figures

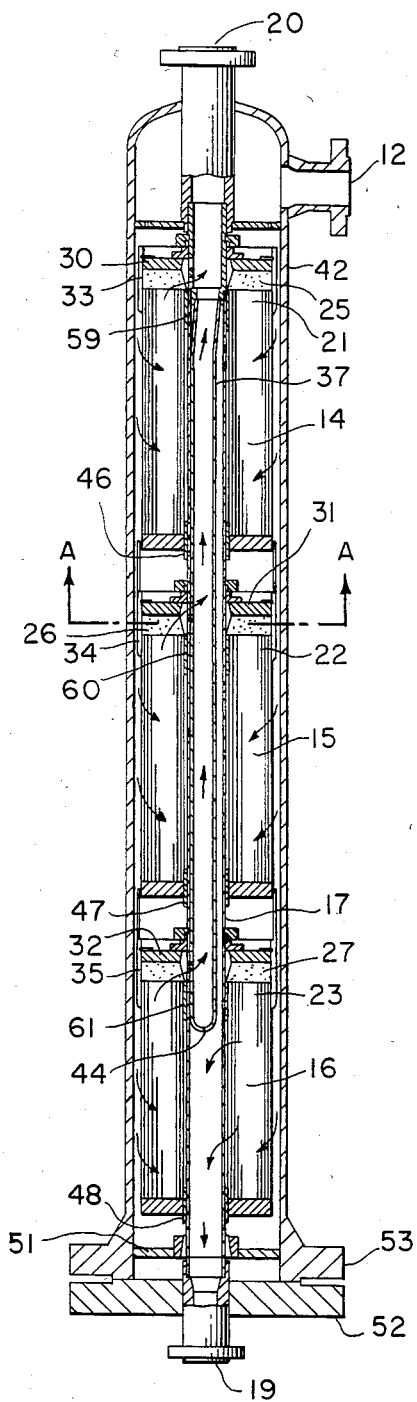

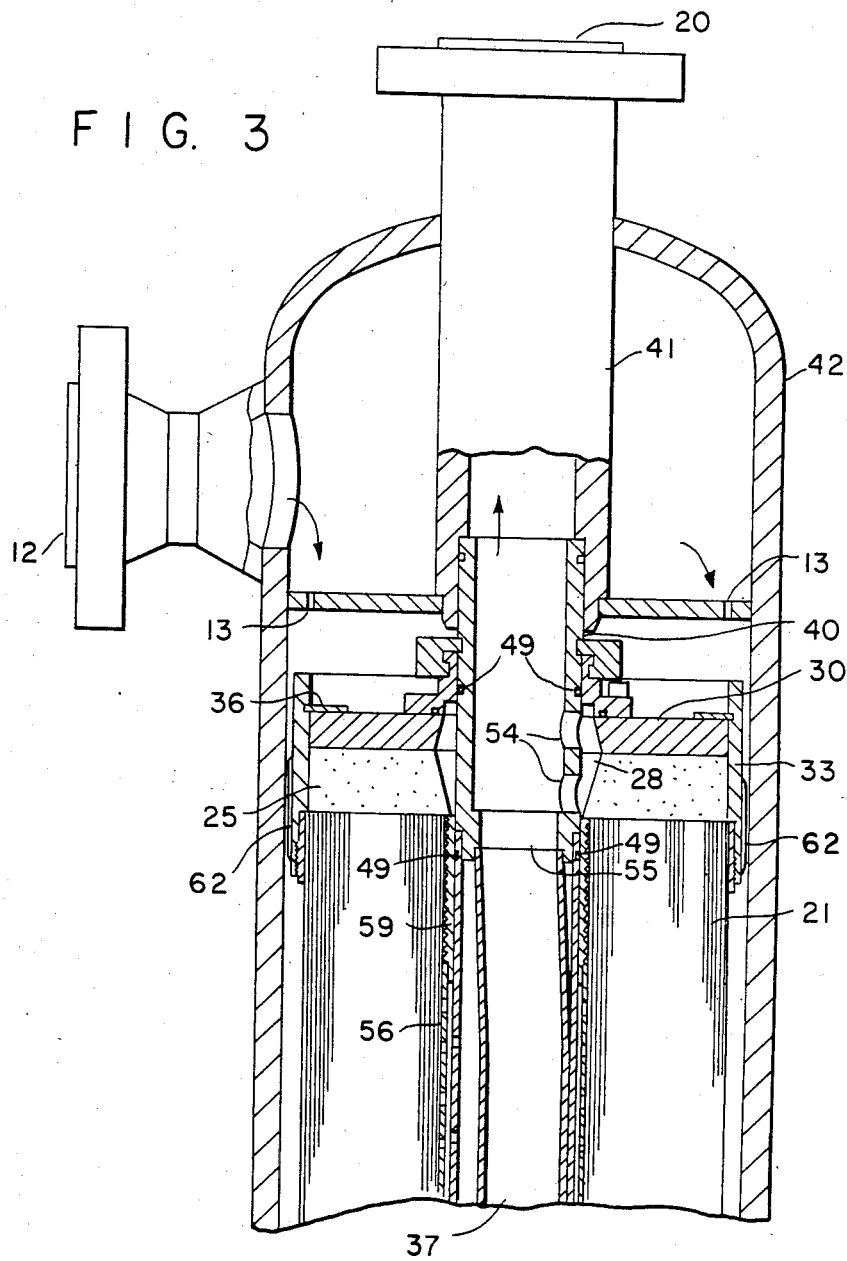

MULTIPLE BUNDLE FLUID SEPARATION APPARATUS

FIELD OF THE INVENTION

The present invention relates to a permeator apparatus for separating fluids in which a plurality of bundles of hollow fibers are removably arranged along the length of a removable tube assembly concentrically located within a cylindrical outer pressure casing.

PRIOR ART

U.S. Pat. No. 4,080,296 discloses a cylindrical two-bundle permeator with three ports with parallel flow of feed, residue and permeate. The bundles are permanently bound together and to a central core in a permanently sealed shell which comprises a low cost disposable assembly. The two bundles have a common tubesheet connected to a common annular peripheral passageway. The structure is defined, however, as a "bundle of hollow fibers" ... with ... "a central 'tubesheet'", with the fiber lengths ... "divided into left and right halves ..."

U.S. Pat. No. 4,451,369 discloses a cylindrical multiple bundle permeator with bundles usually arranged in pairs having a common annular space filled with a collecting means (i.e. porous block, or channels etc.) connected to the adjacent tubesheets. Permeate flows through a dual passage connector to a common permeate outlet pipe. Feed flow is in series through the bundles and has a common annular flow passage only for each pair of bundles. The common central outlet pipe is segmented and there is no attachment means to each bundle.

European patent application Publication No. 053635 discloses a cylindrical multiple bundle permeator in FIG. 6 in which each bundle has a discontinuous core structure that will permit shrinkage of the fibers and will not engage the resin walls to interfere with flow. Each bundle has its own annular space connected to the tubesheet, but only the permeate conduit acts as a common support and channel for all bundles for parallel flow of permeate only. A removable connecting means to locate each bundle on the common support is not disclosed. The remaining structure is adapted for series flow of feed/residue.

SUMMARY OF THE INVENTION

The fiber bundles in the apparatus of the present invention are removably arranged end-to-end in the casing and the permeator output of each bundle is connected to a common central inner tube that is attached to a single port in the end of the casing. The feed fluid is distributed to all bundles simultaneously and the residue is extracted from all bundles simultaneously through a common central outer tube. The tubesheet end of each bundle is removably attached to the outer tube. All fiber bundles operate in parallel with common feed inlet, residue outlet and permeator outlet, therefore keeping the casing porting and external piping simplified to handle only 3 fluid streams. Compared to a series flow permeator, for a given flow rate the parallel arrangement permits operating with lower flow velocities and pressure drops radially through the bundles. Lower feed velocities through the fiber bundle minimize the possibility of fiber breakage especially in the region adjacent to the tubesheet where the fibers tend to be relatively brittle. Lower pressure drops are desirable especially when the feed fluid is a liquid. The design permits the use of short economical fiber bundle modules to build up a large capacity permeator with the minimum number of casing ports which saves in fabrication and piping costs. The use of multiple short bundles permits use of relatively small diameter hollow fibers which could not be used with a single longer fiber bundle due to excessive bore pressure drop. Since the total bundle membrane area is inversely proportional to fiber diameter, the smaller diameter fibers in the short bundles greatly increase membrane area. Because of the benefits of parallel flow and the modular construction of the present invention, any reasonable number (2-6) of fiber bundles can be used. The individual fiber bundle modules can be removed from the casing and central tube assembly for service or replacement.

BRIEF DESCRIPTION OF THE DRAWINGS

FIG. 1 is a cross section view of a permeator of the present invention having three hollow fiber bundles.

FIG. 2 is a cross section of the central tubes taken on line A—A of FIG. 1.

FIG. 3 is an enlarged cross section view of the permeator where feed fluid enters and permeate is removed.

DETAILED DESCRIPTION OF THE DRAWINGS

The permeator of the present invention is suitable for desalinating water by reverse osmosis, ultrafiltration of liquids and enriching gas streams. For simplicity, the present invention will be described in terms of enriching a hydrogen-methane gas mixture. If the feed is a liquid instead of a gas, it may be advantageous to reverse the direction of the feed and residue flow streams.

Figure 6:
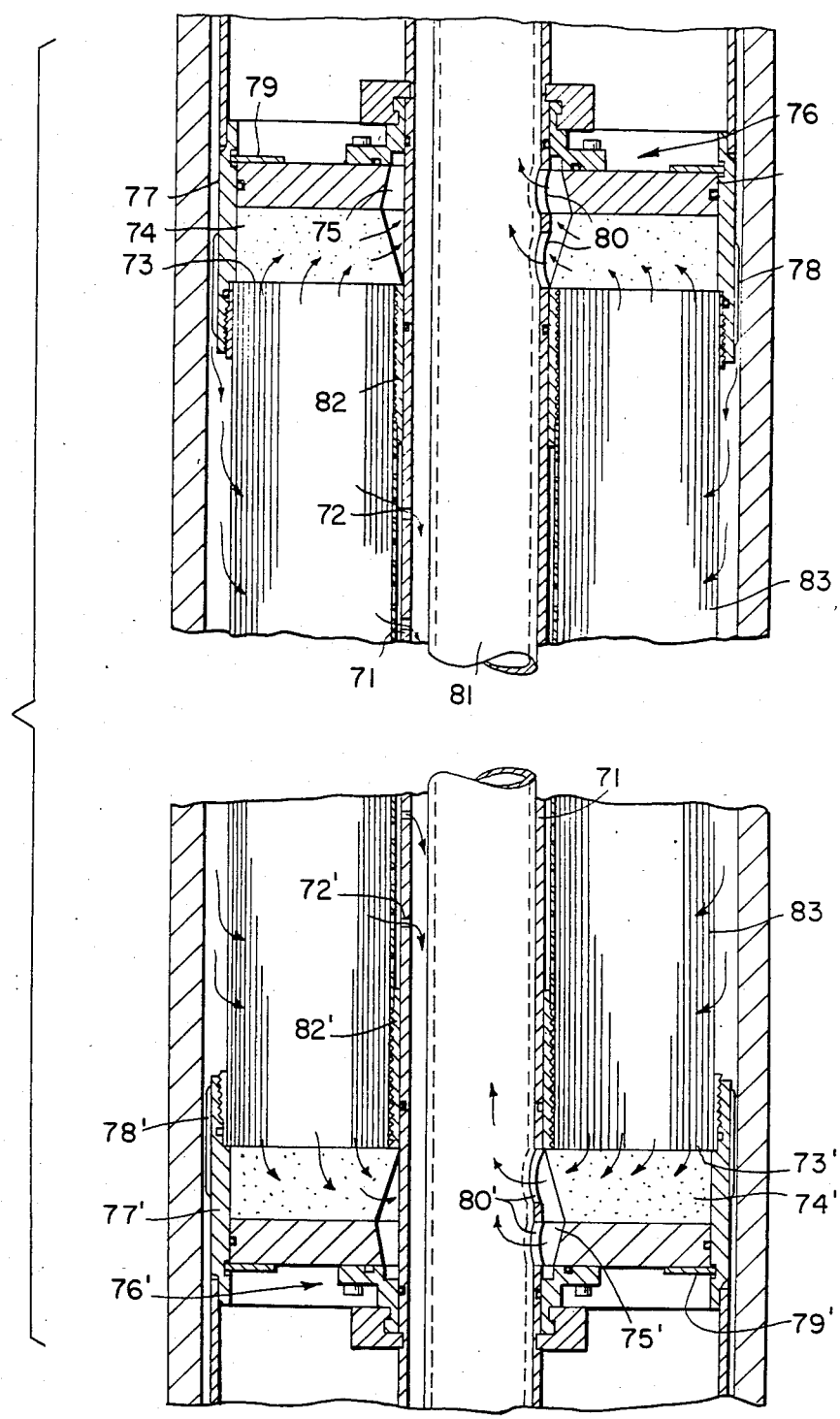
FIG. 6 is a cross section of a double ended permeator bundle.

FIG. 1 shows a multiple bundle permeator with three fiber bundles 14, 15, and 16 each having a single tubesheet 21, 22, and 23 on one end for collecting permeate from one end of the fibers. FIG. 6 shows a variation of the fiber bundle, 83, in which there are tubesheets 73 and 73' at both ends of the fiber bundle so permeate can be collected simultaneously from both ends of the fibers. In the following description of the invention shown in FIG. 1 with single ended bundles, reference will also be made to corresponding elements in the double ended bundle variation of FIG. 6 where appropriate.

Figure 4:
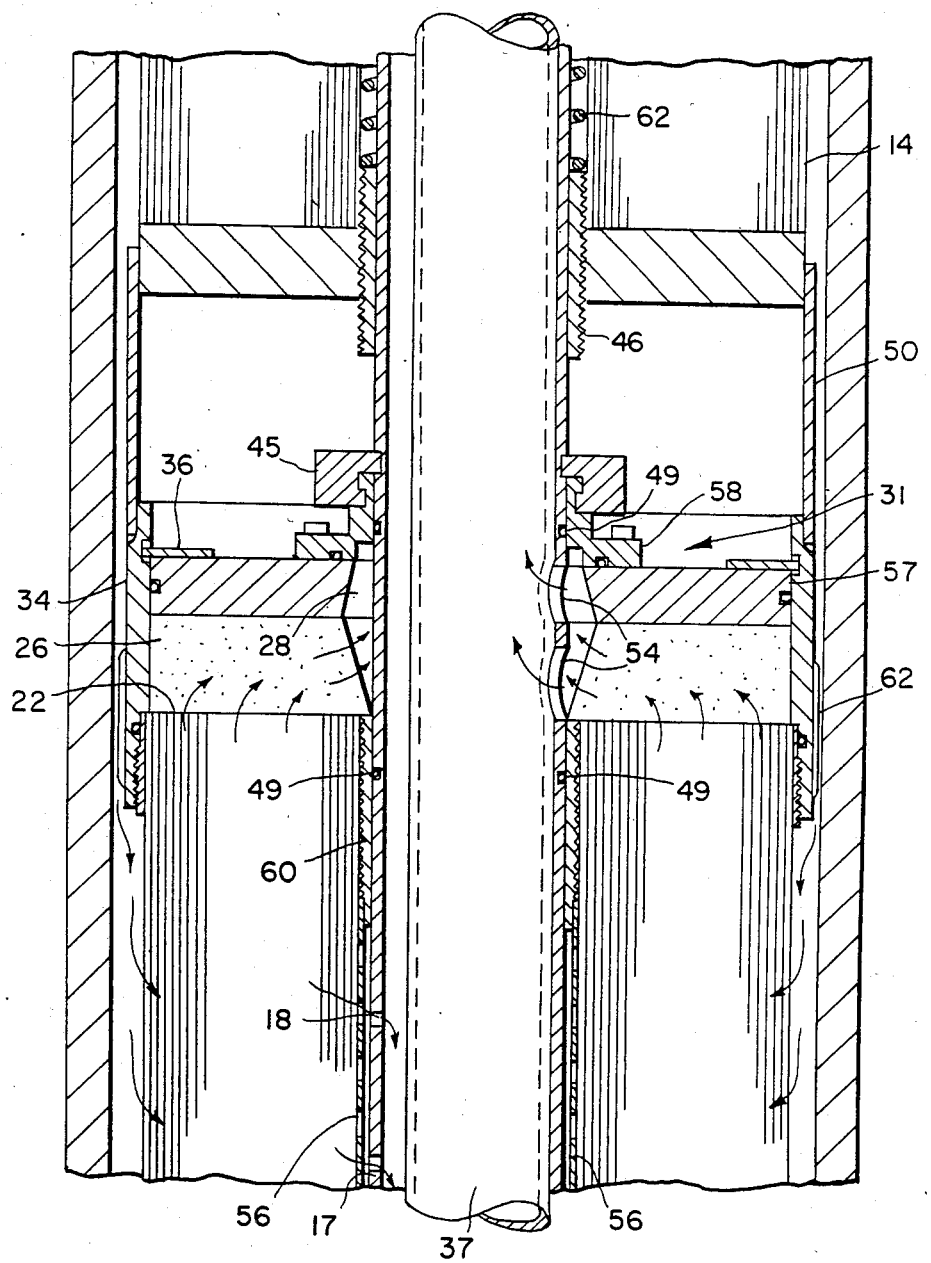
FIG. 4 is a more enlarged cross section of the end members of the individual hollow fiber bundles.
Figure 5:
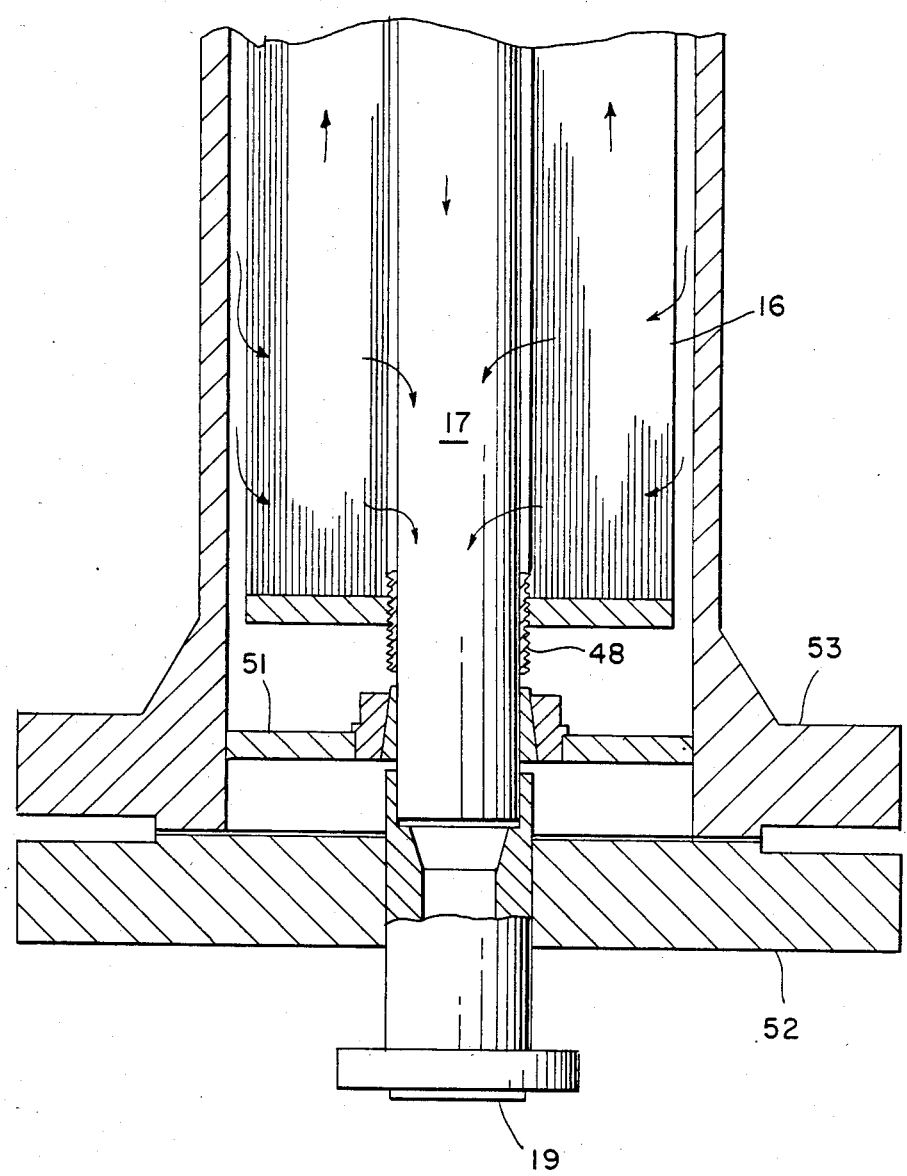
FIG. 5 is an enlarged cross section of the flanged end of the permeator.

Referring now to FIG. 1 and FIG. 6, a permeator indicated generally as 11, is fed with a hydrogen-methane gas mixture through a side inlet port 12. The feed gas mixture passes through distributing holes 13 (FIG. 3) in the feed end plate and forms an annular flow along the outside of the fiber bundles (14, 15, 16, 83). From there the mixture flows radially inward through each bundle. The hollow fiber membranes are selective to hydrogen, so it will pass through the permeable fiber wall much more quickly than the methane. The gas leaving the inner diameter of the bundle and entering outer central tube 17, 71 (FIGS. 1-6) has had much of the hydrogen removed and now consists of a residue gas that is relatively rich in methane. Concerning only the feed stream, the amount of hydrogen removed is a function of the gas temperature, gas composition, feed to permeate pressure ratio and the flow rate through the bundle. The residue gas flows radially inward from each bundle through perforations 18, 72 (FIGS. 2, 4 and 6) in the central outer tube 17, 71. The perforations are sized to assure uniform flow of feed gas/residue through all bundles. The residue then flows axially toward the residue gas outlet 19 at the removable flanged end of the casing. The permeate, that is the hydrogen rich gas that passed through the hollow fiber wall, flows along the fibers in each bundle to that bundle's tubesheet such as 21, 22, 23, and 73, 73′ (FIGS. 1, 3, 4 and 6). Upon exiting the tubesheet, the low pressure permeate flows inward through porous support blocks 25, 26, 27 and 74, 74′ (FIGS. 1, 3, 4 and 6) to low pressure annular chamber 28, 75, 75′ (FIGS. 3, 4 and 6). The low pressure region of the bundle is bounded on one side by the end caps 30, 31, 32, and 76, 76′ and on the other side by tube sheets 21, 22, 23 and 73, 73′; on the inside by the outside surface of the outer central tube 17, 71, and on the outside by the inner surface of the shroud rings 33, 34, 35 and 77, 77′. The shroud rings are attached and sealed to the outer surface of the fiber bundle tubesheets 21, 22, 23 and 73, 73′. The end caps 30, 31, 32 and 76, 76′ are retained via split retaining rings 36, 79, 79′ (FIGS. 3, 4 and 6) bolted to the end caps 30,31 32 and 76, 76′ that engage a groove in the shroud rings 33, 34, 35 and 77, 77′. The shroud rings 33, 34 35 and 77, 77′ have stand-off ribs 62, 78, 78′ (FIGS. 3, 4 and 6) on their outer surfaces to keep the fiber bundle concentric in the casing during assembly. Each end cap, such as cap 31 in FIG. 4, consists of a plate 57, and a collar 58. The collar is bolted and sealed with an "O"-ring to plate 57 which is sealed against the inside of shroud ring 34. The two part cap assembly permits slight radial adjustment of the collar at assembly to compensate for eccentricities between shroud ring 34, plate 57, and outer tube 17 passing through the fiber bundle. The permeate circulates through the annular chamber to two apertures, such as 54, 80, 80′ in the central outer and inner tube 17, 71,37, 81 (FIGS. 2, 4 and 6) which tubes are welded together around this aperture thus sealing the permeate from the residue gas. In the case of the bundle furthest from the flanged end of the casing, the apertures are in a special end fitting 40 for the central outer tube 17, 71 to which the inner tube 37, 81 and central outer tube 17, 71 are welded. The central outer tube 17, 71 is plugged by this fitting but there is an opening 55 in the fitting 40 to the inner tube 37, 81. The permeate collected from all the permeators passes through this fitting 40 and into a specially adapted long neck flange 41 which passes through the casing 42 at port 20. The end of the central inner tube 37 opposite this flange is welded closed as shown at 44 (FIG. 1). The fiber bundle modules 14, 15 and 16, 83 each have a perforated support tube, such as 56 in FIGS. 3 and 4, to support the inner surface of the fibers and add rigidity to the bundle of flexible fibers. At each end of a bundle is a bushing 46, 47, 48, 59, 60, and 61, and 82, 82′ to allow each bundle to be slideably mounted on outer tube 17, 71. The fiber bundle modules 14, 15 and 16 each have one end, their end cap end, rigidly but removably fastened to the central outer tube 17 with a split collar 45 (FIG. 4). The opposite end, or nub end, of each fiber bundle remains slideably mounted on the outer tube by tube bundle bushing 46, 47 and 48 (FIGS. 1, 4 and 5). This arrangement permits axial shrinkage of the fiber bundle. A spring is located at the nub end of the support tube to allow the bundle bushing to move relative to the support tube. In the case of the double ended bundle 83 in FIG. 6, the tubesheet end 73 is rigidly but removably fastened to central outer tube 71, and tubesheet end 73′ remains slideably mounted by bushing 82′. Tubesheet end cap 76′ should be located with respect to apertures 80′ so a sealable communication between chamber 75′ and apertures 80′ is maintained before and after shrinkage of the fiber. At the end cap end of each bundle there are seals 49 (FIGS. 3 and 4) on either side of the two apertures 54 and 80, 81′ to the central inner tube. These seal the annular chamber from the casing volume so high pressure feed gas does not leak into and mix with permeate. Between the nub end of one bundle and the end cap end of the next there is a shield ring 50 (shown in FIG. 4 only) that serves to keep the feed gas flowing axially along the inside of the casing, thus decreasing pressure drop of feed fluid as it flows from one bundle to the next. Referring only to FIG. 1, as can be seen the central outer tube 17 forms a rigid backbone on which to mount the fiber bundles. At the flanged end of the shell there is a removable end plate 51 clamped to the outer tube to locate it centrally in the shell to facilitate assembly with the end flange 52. To assemble the permeator, the fiber bundles 14, 15 and 16 are first individually assembled, then each bundle is slid onto the outer tube 17 and positioned so the split collars 45 will simultaneously align with the groove in the outer tube 17 and the groove in the tube bundle end cap. When all bundles 14, 15, and 16 are assembled on the central outer tube 17, it is slid into the permeator casing 42 until the special end fitting 40 engages the long neck flange 41 at the far end of the casing. The end flange 52 is then engaged with the central outer tube 17 and bolted to the casing flange 53. For replacement of the fiber bundles or servicing, the fiber bundles can be removed by reversing the assembly procedure.

I claim:
1. A hollow fiber permeator comprising:
   A. A casing having the shape of an elongated cylinder closed at both ends with one closure being a removable member;
   B. A removable tubular assembly within said casing, comprising a central outer tube the interior of which is in communication with a first port at one end of said casing and with the exterior of said central outer tube, and an inner tube attached within said central outer tube, said inner tube in communication with a second port at the end of said casing opposite the first port;
   C. A plurality of bundle assemblies, each comprising an annular cross section bundle of hollow fibers having an end mounted in an annular tubesheet and communicating with an annular chamber, said assemblies each removably mounted on said outer tube;
   D. Means for communicating between each said annular chamber and the inner tube recited in B. above;
   E. A third port in said casing in communication with the exterior of said bundle assemblies.
2. The permeator of claim 1 wherein said removable tubular assembly has an end fitting adjacent the second port which blocks fluid flow within said central outer tube.
3. The permeator of claim 2 wherein the inner tube and central outer tube have matching apertures spaced along their length corresponding and in communication with the annular chambers within the bundle assemblies and the inner tube is sealably attached to the wall of the central outer tube at each aperture.

4. The permeator of claim 3 wherein the tubesheet end of each bundle assembly is removably attached to the central outer tube with said annular chamber sealably communicating with one of said spaced apertures and where the opposite end of each bundle is slideably attached to said central outer tube.

5. The permeator of claim 3 wherein said bundle assemblies have opposite ends of said hollow fibers mounted in a separate annular tubesheet each of which communicates with an annular chamber.

6. The permeator of claim 5 wherein one tubesheet of each bundle assembly is removably attached to the central outer tube with said annular chamber in fixed sealed communication with one of said spaced apertures and wherein the opposite tubesheet end of each bundle is slideably attached to said central outer tube.

7. The permeator of claim 4 wherein said annular tubesheet has an annular shroud ring sealably attached thereto, and an annular end cap is sealably attached to said shroud ring to enclose said annular chamber on the outer three sides.

8. The permeator of claim 7 wherein said annular end cap comprises an annular plate with a radially adjustable annular collar sealably attached to one surface of the plate.

9. The permeator of claim 1 wherein said bundle assemblies have opposite ends of said hollow fibers mounted in a separate annular tubesheet each of which communicates with an annular chamber.

10. The permeator of claim 1 wherein the first port is the residue outlet, the second port is the permeator outlet and the third port is the feed inlet.

11. The permeator of claim 1 wherein the first port is the feed inlet, the second port is the permeator outlet and the third port is the residue outlet.

* * * * *